(Specimens.)

J. F. FISCHER & O. PETERS.
ARTIFICIAL STONE FILTER.

No. 509,887. Patented Dec. 5, 1893.

Witnesses:
J. B. Bolton
E. K. Sturtevant

Inventors:
Johann Friedrich Fischer
Otto Peters
By Richards &c.
their Attorneys.

UNITED STATES PATENT OFFICE.

JOHANN FRIEDRICH FISCHER AND OTTO PETERS, OF WORMS, GERMANY, ASSIGNORS TO THE WORMSER FILTERPLATTEN WERK, PETERS, BITTEL & CO., OF SAME PLACE.

ARTIFICIAL-STONE FILTER.

SPECIFICATION forming part of Letters Patent No. 509,887, dated December 5, 1893.

Application filed November 30, 1892. Serial No. 453,563. (Specimens.)

*To all whom it may concern:*

Be it known that we, JOHANN FRIEDRICH FISCHER and OTTO PETERS, subjects of the Emperor of Germany, and residents of Worms, German Empire, have invented certain new and useful Improvements in Artificial-Stone Filters, of which the following is a specification.

Figure 1:
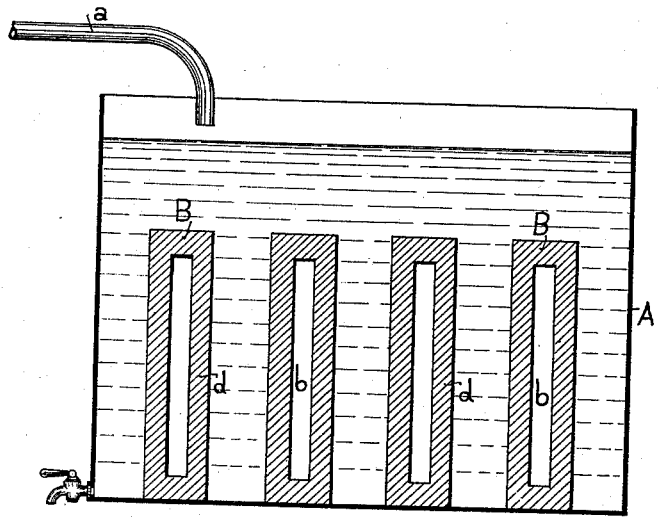
Figure 2:
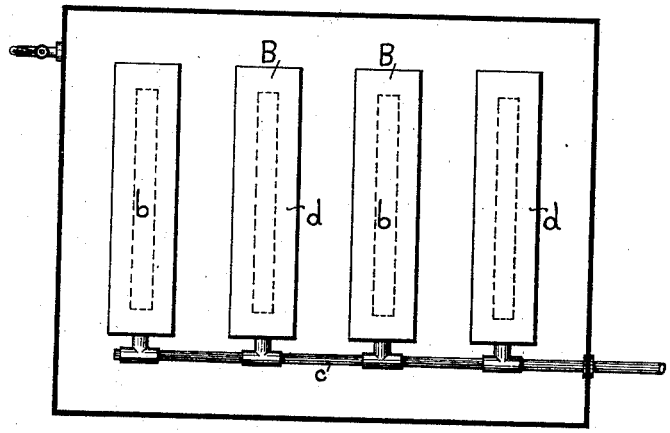

In the drawings Figure 1 represents a vertical central section of our filter arranged in a suitable tank; and Fig. 2 is a plan view of the same.

This invention relates to the manufacture of materials for filtering liquids and to apparatus adapted for using such materials.

Numerous attempts have heretofore been made to produce artificial filtering media by cementing pulverized clay, pumice stone, sand, charcoal and the like. The products obtained in this manner possess however without extion the disadvantage of being only suitable for filtering liquids which do not contain any agents acting as solvents, such as alkalies or powerful acids. The employment of such filtering media has therefore been limited to certain purposes, such as for instance to filtering drinking water.

The present invention comprises a method of producing materials designed for filtering liquids which materials, excepting in hydrofluoric acid, are quite insoluble in any liquids produced in the chemical industry, more particularly alkalies and acids, and they possess, moreover the advantage that when, after they have been used for a certain time, a decrease in the effectiveness owing to the partial stopping up of the pores is noticeable, they can be revived by annealing without causing a deleterious alteration in the filtering material. This object is realized by cementing pure quartz with alkaline silicate of lime, while observing certain conditions, in such a manner that the said silicate is changed by the cementing process in a pure chemical and physical state and converted by abundant enrichment with silicic acid into a product which as regards its qualities approximates quartz.

It is well known that if ordinary glass is used for cementing the quartz, the operation being conducted in such a manner that the chemical nature of the glass is retained, no resistant filtering media can be produced, for glass as such, more especially in the finely divided state wherein it occurs in the filtering media is attacked by dissolving agents, so that the adhesion of the whole filtering material is relaxed. When however a very high percentage of silicic acid is given to the alkaline silicate of lime, as it is usually supplied in the trade, the resistance of the same to chemical agents will be considerably increased and a material will at the same time be obtained which is very difficult of fusion and not sensitive to changes of temperature.

In carrying the improved method into practice this fact has been utilized in the following manner. Pure quartz sand, preferably of sharp-edged form, is, according to the size of its grains and its other condition, intimately mixed with from about one-twentieth to one-quarter its quantity to finely pulverized glass and subjected in molds to a high temperature. The glass then fuses and is drawn by capillary action to the points of contact between the grains of quartz. The high temperature is now maintained for a comparatively long time, when the peculiar phenomenon occurs that the glass adhering in the liquid state to the grains of quartz is gradually saturated more and more with silicic acid, becomes difficult of fusion and therefore assumes a more solid form. Consequently the grains of quartz which at the beginning of the burning operation are easily movable relatively to one another will firmly adhere to each other in the further continuation of the burning process even at the high temperature. When this solidifying process has wholly or partly taken place the operation is terminated, and the filtering materials may then be slowly cooled and if necessary their surface prepared or they may be put in frames or otherwise dealt with. The filtering materials obtained in this manner offer, as above stated, a great resistance to dissolving agents and can, without becoming soft, be heated to a temperature which is far above the melting point of ordinary glass, as the glass used for cementing the grains of sand, as above mentioned, has obtained a higher melting point by the cementing process.

According to the present invention use is made of an improved apparatus for using the said filtering material. This apparatus comprises a receptacle which contains the water or other liquid to be filtered and in which terminates a pipe for introducing the said liquid. The aforesaid receptacle may be either open or closed and has provided in it a suitable number of hollow bodies arranged so as to form any desired system, such bodies consisting of filtering material produced in the above described manner, the liquid to be purified being caused to pass through their walls into their interior and thence in a purified state through a pipe which connects all the interior spaces of the filtering bodies into a basin or to the place where it is used. Under these circumstances the impurities in the liquid remain in the pores of the filtering bodies from which they are removed by forcing water or other liquid at a small pressure through the apparatus in the reverse direction to that in which the filtering takes place that is to say by causing it to pass through the said pipe into the interior of the filtering bodies and thence through the walls of the latter into the receptacle. To free the filtering bodies from bacteria and fungi, hot steam is introduced through the said pipe into the interior of the filtering bodies, which steam, passing through the walls of the filtering bodies will destroy such organisms.

Having now particularly described our said invention, what we claim, and desire to secure by Letters Patent of the United States, is—

The hereinbefore described method of making filter plates consisting in subjecting a mixture of pulverized silica and glass to a high temperature, maintaining this temperature until the glass becomes saturated with silicic acid and finally cooling the same, substantially as described.

In witness whereof we have hereunto set our hands in presence of two witnesses.

JOHANN FRIEDRICH FISCHER.
OTTO PETERS.

Witnesses:
 FRITZ BITTEL,
 FR. MELCHIOR.